United States Patent [19]

Ohsawa et al.

[11] Patent Number: 5,757,369
[45] Date of Patent: May 26, 1998

[54] DISPLAY SYSTEM HAVING PLURALITY OF DISPLAY AREAS

[75] Inventors: Kengo Ohsawa; Yoshiharu Morohashi; Satomi Sakai, all of Kawasaki, Japan

[73] Assignee: Fujitsi Limited, Kawasaki, Japan

[21] Appl. No.: 748,720

[22] Filed: Nov. 14, 1996

Related U.S. Application Data

[63] Continuation of Ser. No. 214,279, Mar. 17, 1994, abandoned.

[30] Foreign Application Priority Data

Mar. 31, 1993 [JP] Japan .................. 5-073877

[51] Int. Cl.⁶ .................................................. G06F 3/14
[52] U.S. Cl. ................................ 345/340; 345/346
[58] Field of Search .............................. 395/340, 341, 395/342, 343, 344, 345, 346, 347

[56] References Cited

U.S. PATENT DOCUMENTS

| | | |
|---|---|---|
| 4,245,321 | 1/1981 | Gennetten .................. 395/137 |
| 4,467,448 | 8/1984 | Regehr et al. .................. 395/115 |
| 4,973,951 | 11/1990 | Shigeta et al. .................. 345/1 |
| 4,988,995 | 1/1991 | Buisson et al. .................. 340/971 |
| 5,113,251 | 5/1992 | Ichiyandai et al. .................. 358/500 |
| 5,121,195 | 6/1992 | Seki et al. .................. 358/515 |
| 5,121,478 | 6/1992 | Rao .................. 395/346 |
| 5,198,909 | 3/1993 | Ogiwara et a. .................. 358/412 |
| 5,264,948 | 11/1993 | Imoto .................. 358/474 |
| 5,302,970 | 4/1994 | Lakso et al. .................. 345/168 |

FOREIGN PATENT DOCUMENTS 58-2881 1/1983 Japan .

*Primary Examiner*—Thomas G. Black
*Assistant Examiner*—Ruay Lian Ho
*Attorney, Agent, or Firm*—Staas & Halsey

[57] ABSTRACT

A display system includes a plurality of display areas on which images are displayed, and a processing unit for controlling display formation of images on the plurality of display areas so that the images are displayed with predetermined orientations different from each other. Another type of display system includes a display panel on which an image is displayed, and a processing unit for controlling display formation of an image on the display panel so that the image is displayed rotated by an angle.

13 Claims, 12 Drawing Sheets

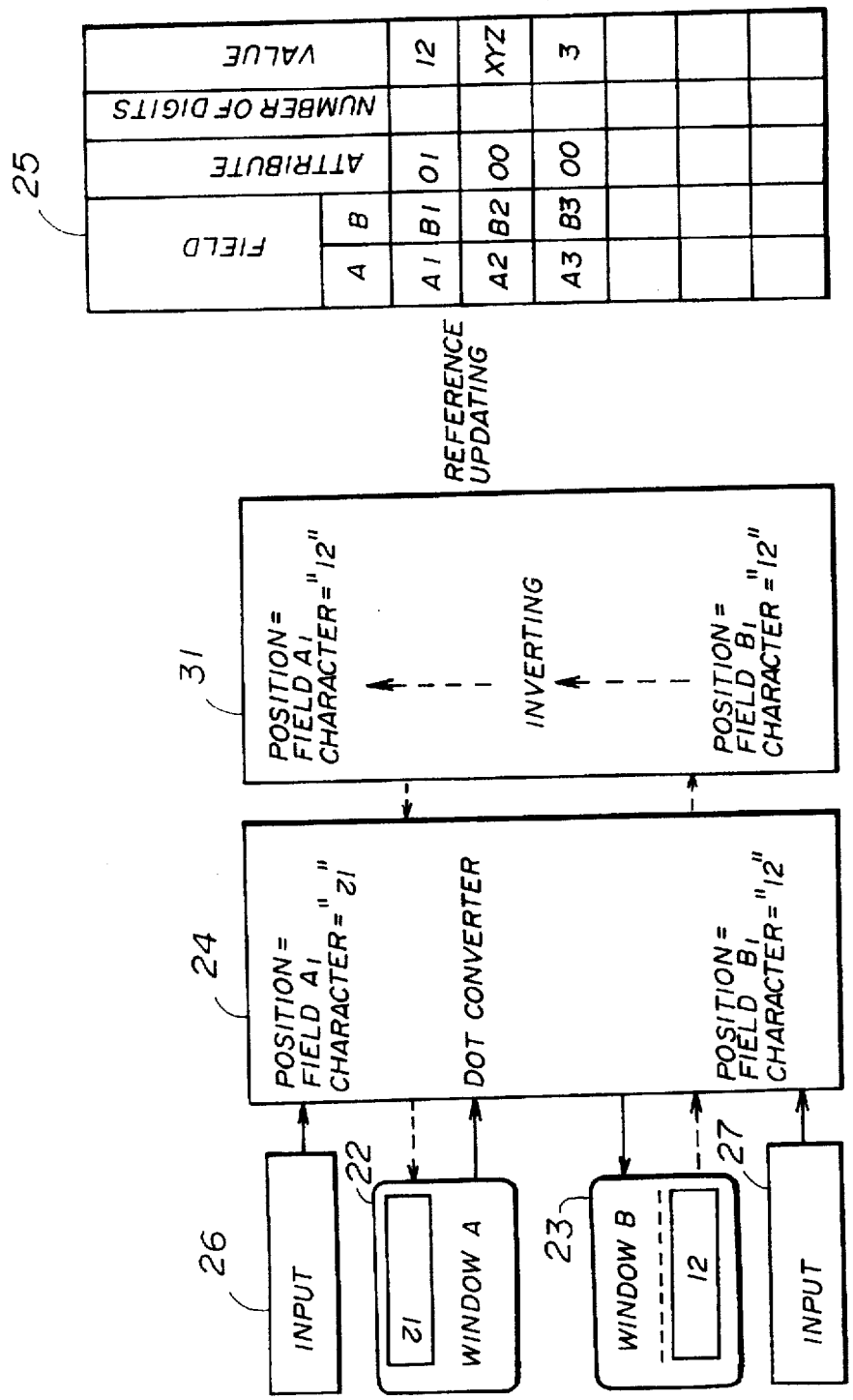

DISPLAY SYSTEM HAVING PLURALITY OF DISPLAY AREAS

This application is a continuation of application Ser. No. 08/214,279, filed Mar. 17, 1994, now abandoned.

BACKGROUND OF THE INVENTION

(1) Field of the Invention

The present invention generally relates to a display system used, for example, for demonstration and simulation in a business talk with customers and, more particularly, to a display system having a plurality of display areas respectively assigned to a plurality of persons.

(2) Description of Related Art

Recently, display units controlled by computers have been used in negotiations in commercial transactions and other scenes. In, for example, explanation of premium, disbursement and insurance money in an insurance contract, in trade negotiations of real estate, vehicles, installations, equipment and the like, and in financing in accordance with various interest rates, it is difficult for customers to understand details. Demonstrations using graphs, tables and the like and simulations of transactions are helpful to persons in explanation of various objects. Thus, display units used for the demonstrations and simulations of transactions to persons are useful.

A conventional display system of this type is formed as shown in FIG. 1 (see Japanese Laid Open Patent Application No. 58-2881). Referring to FIG. 1, this system is provided with a memory 14 for an operator and an inverting memory 15. Character dot patterns 16 are stored in the memory 14, and character dot patterns 17 which are inverted are stored in the inverting memory 15. Either the memory 14 or the inverting memory 15 is selected by an operation of a key 11 on a key board 10. A display panel 1 is located between an operator and a customer who face each other, and they can simultaneously look at a screen of the display panel 1. If the memory 14 is selected by the operation of the key 11, the character dot patterns 16 are supplied from the memory 14 to the display panel 1. As a result, characters corresponding to the character dot patterns 16 are displayed on the display panel 1 with the correct orientation for the operator. This screen on the display panel 1 is referred to as an operator screen (2). On the other hand, if the inverting memory 15 is selected by the operation of the key 11, the character dot patterns 17 which are inverted are supplied from the inverting memory 15 to the display panel 1. As a result, characters corresponding to the character dot patterns 17 are inverted and displayed on the display panel 1. That is, the characters are displayed on the display panel 1 with the correct orientation for the customer on the opposite side of the display panel 1. This screen on the display panel 1 is a customer screen (1).

In the conventional display system described above, the customer screen (1) is switched to the operator screen (2) and vice versa on the display panel 1 by the operation of the key 11. That is, when the display panel 1 has the operator screen (2), the customer screen (1) does not appear, so that the customer must wait. In addition, to switch the screen on the display panel 1, the key operation must always be performed after information to be displayed in a new screen is input. Thus, the operation is inconvenient.

Furthermore, a character-recognition pad used for a pen inputting operation may be provided on the display panel 1. In this case, characters displayed on the character-recognition pad are inverted every time the customer screen (2) is switched to the operator screen (1) and vice versa. Thus, the screen on the display panel 1 is inconvenient for viewing.

SUMMARY OF THE INVENTION

Accordingly, a general object of the present invention is to provide a novel and useful display system in which the disadvantages of the aforementioned prior art are eliminated.

A more specific object of the present invention is to provide a display system which can be smoothly used by a plurality of persons without complicated operations.

Another object of the present invention is to provide a display system in which it is convenient for a plurality of persons to look at characters displayed on a display panel.

The above objects of the present invention are achieved by a display system comprising: a plurality of display areas on which images are displayed; and display control means for controlling display formation of images on the plurality of display areas so that the images are displayed with predetermined orientations different from each other.

The above objects of the present invention are also achieved by a display system comprising: a plurality of display areas to which orientations of images to be displayed thereon are assigned, each of the plurality of display areas being divided into a plurality of fields; a table indicating fields corresponding to each other in the plurality of display areas; and display control means for displaying an image in fields of the plurality of display areas having the orientations assigned thereto which fields are indicated by the table as fields corresponding to each other.

The above objects of the present invention are also achieved by a display system comprising: a plurality of display areas to which orientations of images to be displayed thereon are assigned; a table indicating whether or not an image is to be displayed in each of the plurality of display areas; and display control means for displaying an image in each of the plurality of display areas, which image is indicated by the table as requiring display therein, with the orientation assigned thereto.

According to the above display systems, images can be displayed on the plurality of display areas with the correct orientations for a plurality of persons. Thus, it can be convenient for a plurality of persons to view characters displayed on the plurality a display areas.

The above objects of the present invention are also achieved by a display system comprising: a display panel on which an image is displayed; and display control means for controlling display formation of an image on the display panel so that an image rotated by an angle is displayed.

According to the above display system, since an image rotated by an angle is displayed on the display panel, the image can be displayed with the correct orientation for any person.

Additional objects, features and advantages of the present invention will become apparent from the following detailed description when read in conjunction with the accompanying drawings.

DESCRIPTION OF PREFERRED EMBODIMENTS

A description will now be given, with reference to FIG. 2, of the principle of embodiments of the present invention.

Figure 1:
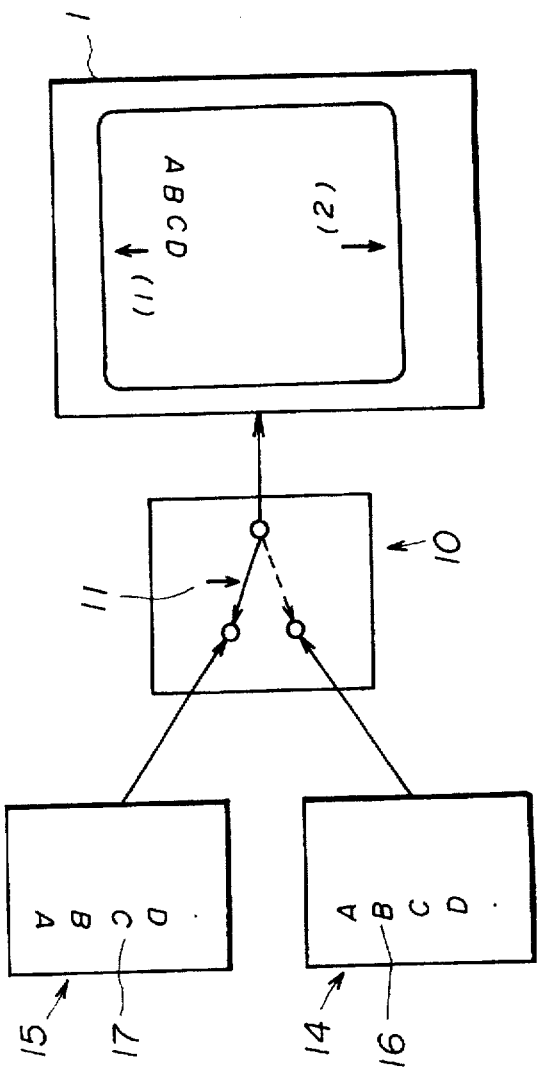
FIG. 1 is a diagram illustrating a conventional display system.
Figure 2:
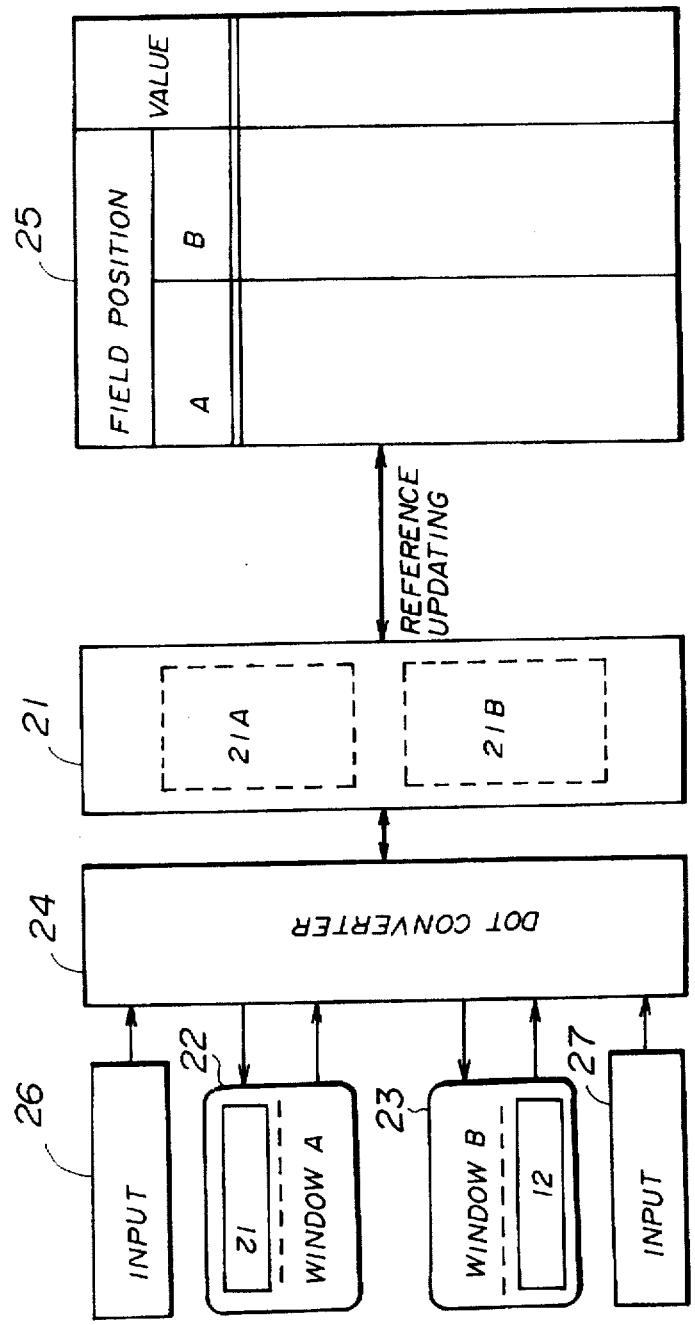
FIG. 2 is a diagram illustrating the principle of a display system according to an embodiment of the present invention.

Referring to FIG. 2, a display system has a processing unit ("PROC. UNIT") 21, a first window 22 for a customer, a second window 23 for an operator and a dot converter ("DOT CONV.") 24. The first and second windows 22 and 23 are separately formed on a single display panel. The dot converter 24 which is connected to the windows 22 and 23 and the processing unit 21 performs transmission/receiving of input/output field information and input/output values and inverts dot data. The display system has also a definition data table ("0.0. TABLE") 25 indicating field positions defined in accordance with use and purpose and various data items regarding conditions. The processing unit 21 refers to and updates information in the definition data table 25.

The field position is a position at which a field is formed in a display coordinate system set on the display panel, and represented by coordinates (Xn,Yn) of the left upper corner point, the height (Hn) and the width (Wn). The height (Hn) and the width (Wn) are represented by the length, or the number of dots, from the left upper corner point. The right lower corner point of the field is represented by coordinates (Xn+Wn,Yn+Hn). In the processing unit 21 and the dot converter 24, the field position is indicated by internal numbers corresponding to fields A1, A2, . . . , and B1, B2, . . . .

The processing unit 21 may be a single unit in which switching control of display direction, display data and the like is performed in accordance with instructions. The processing unit 21 may be also divided into a first unit 21A corresponding to the first window 22 and a second unit 21B corresponding to the second window 23. In a case where the processing unit 21 is divided into the first and second units 21A and 21B, the switching control of the display direction and the display data is not needed, but communication between the first and second units 21A and 21B must be performed to prevent interference of the first and second units 21A and 21B with each other.

The field positions and data which has been previously defined in the definition data table 25 are used as reference data by the processing unit 21 and are updated thereby.

The display system is also provided with at least one input unit. The input unit is used to input various information items, instructions and the like. It is preferable that there are two input units 26 and 27 for the respective windows 22 and 23. The input unit may be a keyboard or a pen inputting unit having a input pad put on the display panel. Regarding restricted information, a bar-code reader and a speech input unit may be also used as the input unit.

The operator operates the input unit, so that various conditions, data, desired form and the like are input into the display system. The processing unit 21 processes the input data with reference to the contents in the definition data table 25. Required data is supplied to at least one of the first and second windows 22 and 23 via the processing unit 21 and the dot converter 24 and is displayed on it. The contents in the definition data table 25 are updated if necessary.

The operator and the customer are on the opposite sides of the display panel. Characters are displayed in the first window 22 with the correct orientation for the customer, and characters are displayed in the second window 23 with the correct orientation for the operator. Thus, when characters for the operator are changed to those for the customer and vice versa on the display panel, operations are not needed to change the orientation with which the characters are displayed on the display panel. Displayed items and contents can be selectively switched, or may be preset.

The display control of the first and second windows 22 and 23 may be performed so that data items, such as results in a calculating process, help messages for the operator and memorandums for the operator, which are not needed for the customer, are displayed in only the first window 22 (not in the second window 23).

It is preferable that the display system according to the present invention be miniaturized so as to be portable. In a case where the display system is portable, it is preferable that the input unit be the pen inputting unit using a light-pen.

The display system may be a stand-alone system or be also connected to a host computer by a line. In a case where the display system according to the present invention is connected to a host computer, the display system can be uses as a teller terminal in financial services, public institutions, administrative institutions and the like. In a case where the display system according to the present invention is used as the teller terminal, data regarding a user (a customer), such as a code number, an identifying number, a birthdate, a name and the like are input by means of the keyboard or the light-pen, and a person in charge (an operator) inputs additional data into the display system. Thus, in this case, business routines can be efficiently performed.

A description will now be given of a first embodiment of the present invention.

Figure 3:
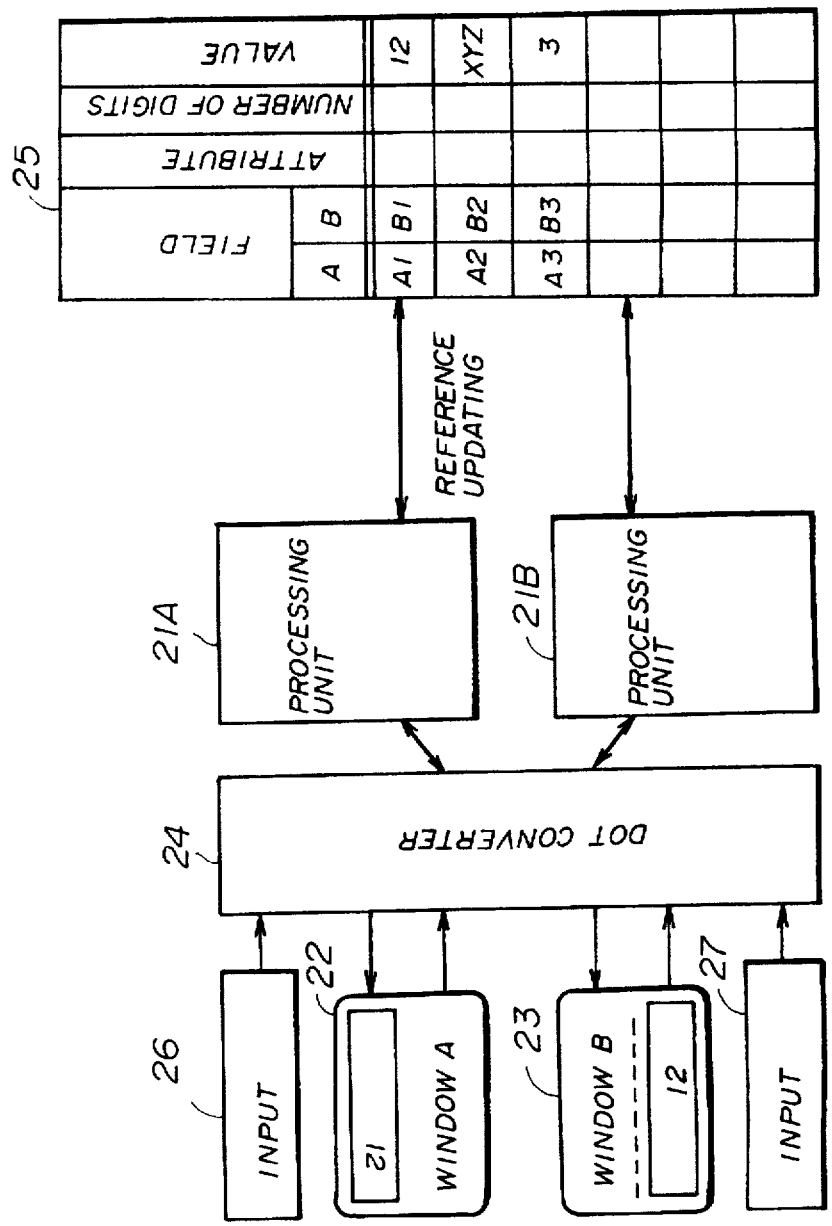
FIG. 3 is a block diagram illustrating a display system according to a first embodiment of the present invention.

FIG. 3 shows a display system according to a first embodiment of the present invention. The display system has the first window 22 and the second window 23 both of which are formed on a single display panel. The first window 22 and the second window 23 are respectively referred to, for example, as a customer window and an operator window. The display system has the first processing unit 21A for the customer window 22 and the second processing unit 21B for the operator window 23. This display system is formed in a so called pen-inputting type computer. That is, in input units 26 and 27 which are respectively for the customer window 22 and the operator window 23, information can be input using light-pens. The display system has also the dot converter 24 and the definition data table 25 in the same manner as that shown in FIG. 2. The definition data table 25 includes "field" (FLD), "attribute" (ATT.), "number of digits" (No. of DIG'S) and "value" (VL). In the "field", fields provided in the windows 22 and 23 are indicated. In the "number of digits", the number of characters which can be displayed in each of the fields is indicated. In the "value", an image to be displayed on each of the fields is indicated. The "attribute" will be described latter.

Not only can the operator input information using the light-pen of the input unit 27 but also the customer can input information using the light-pen of the input unit 26. The definition data table 25 is shared by the first and second processing units 21A and 21B. That is, the definition data table 25 is formed in a shared memory between the first and second processing units 21A and 21B. The customer window 22 is divided into a plurality of fields A1, A2, ..., and the operator window 23 is divided into a plurality of fields B1, B2, .... In each of the windows 22 and 23, images (e.g. characters) can be simultaneously displayed in a plurality of fields. The first processing unit 21A carries out display control in each of the fields of the customer window 22 and controls the input unit 26. The second processing unit 21B carries out display control in each of the fields of the operator window 23 and controls the input unit 27. When the communication between the first and second processing units 21A and 21B is performed, the windows 22 and 23 are controlled so that information is simultaneously displayed on both the windows 22 and 23 or is displayed on a selected one of the customer window 22 and the operator window 23.

Figure 4A:
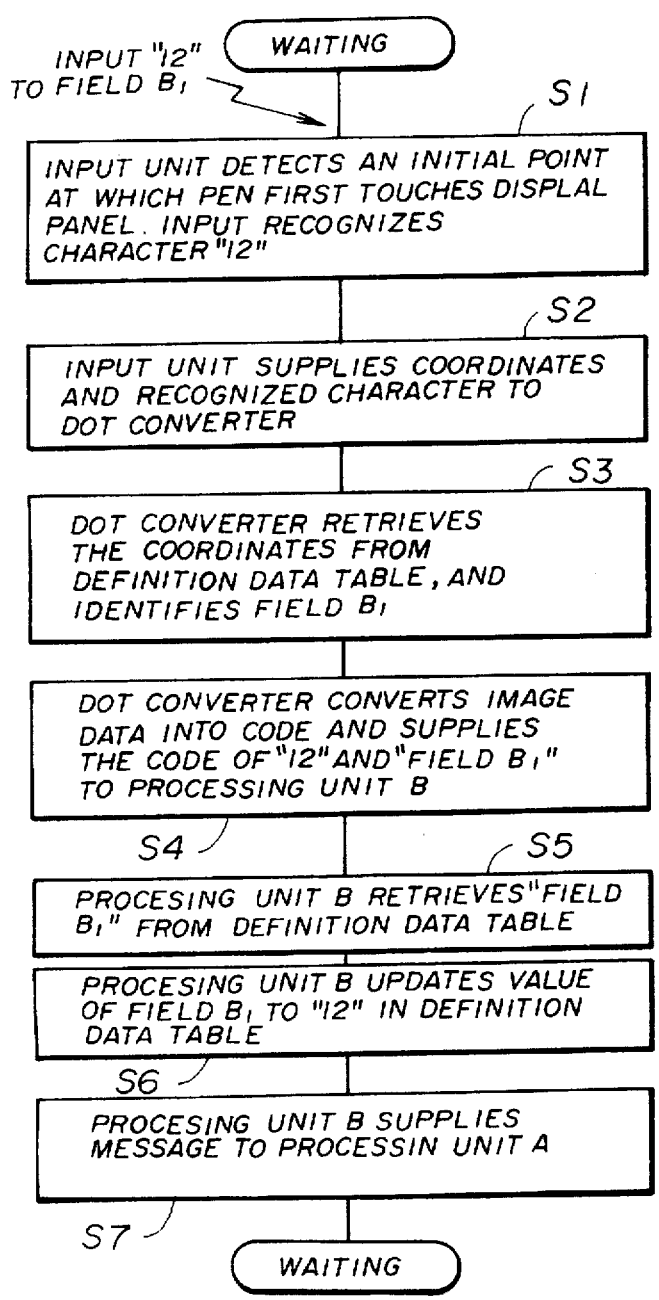
FIG. 4A is a flow chart illustrating a process executed in the display system shown in FIG. 3.
Figure 4B:
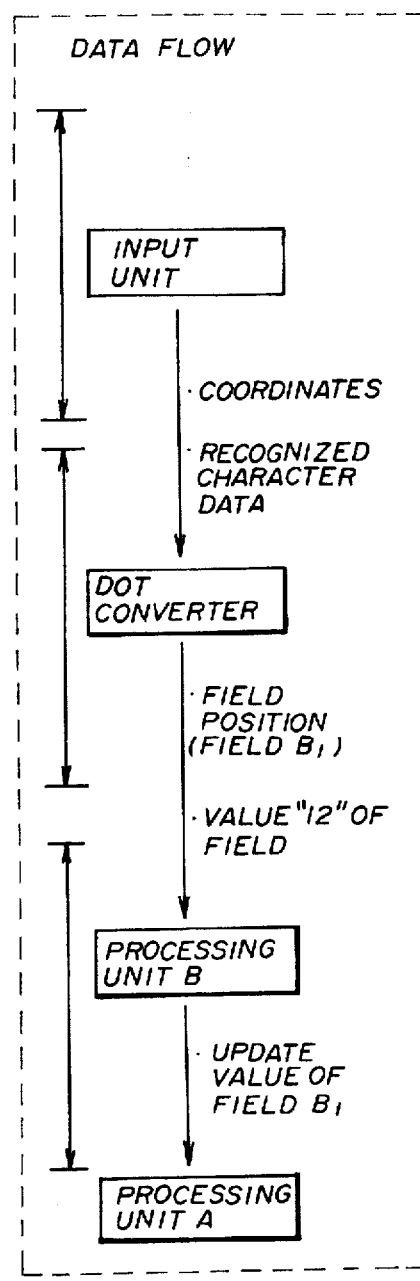
FIG. 4B is a diagram illustrating a data flow in the process shown in FIG. 4A.

FIG. 4A shows a process in a case where a numeral "12" is input into a field of the operator window 23 using the light-pen to change the value of the field. FIG. 4B shows a data flow in this process.

The second processing unit 21B ("B") is waiting for an input operation using the light-pen or a message from the first processing unit 21A. In this state, the operator carries out an input operation using the light-pen in the field B1 on the operator window 23. That is, the operator draws, for example, a numeral "12" on the operator window 23 using the light-pen (the numeral "12" is input to the field B1). When the input operation is performed, the input unit 27 recognizes an initial point (coordinates) at which the light-pen first touches the surface (an input pad) of the operator window 23, and obtains image data corresponding to the trace of the light-pen drawing the numeral "12" on the surface (an input pad) of the operator window 23, in step S1. The data obtained by the input unit 27 is supplied from the input unit 27 to the dot converter 24 in step S2.

The dot converter 24 retrieves a coordinate data item, representing the above initial point, from the definition data table 25 including coordinate data items representing the fields belonging to the operator window 23 in step S3. As a result, the dot converter 24 identifies, for example, a field B1 as the field on which the numeral "12" was drawn. The dot converter 24 converts the image data supplied from the input unit 27 into a code corresponding to the image data of the numeral "12", and supplies the codes of the numerals "12", which is a character to be displayed, and the field B1, corresponding to a position at which the characters are to be displayed, to the second processing unit 21B, in step S4.

The second processing unit 21B searches the fields belonging to the operator window 23 in the definition data table 25 for the field B1 in step S5. When the second processing unit 21B finds the field B1 in the definition data table 25, the second processing unit 21B changes the value of the field B1 to "12" in the definition data table 25 in step S6. Furthermore, the second processing unit 21B supplies a communication message, indicating that the value of field B1 has been changed, to the first processing unit 21A in step S7. After this, the second processing unit 21B goes into the waiting state.

In the above process, the steps S1 and S2 are performed in the input unit 27, the steps S3, S4 are performed in the dot converter 24, and the steps S5, S6 and S7 are performed in the second processing unit 21B. In addition, when the code corresponding to the characters "12" and the field B1 are obtained by the dot converter 24, the code and information of the field B1 are supplied to the display panel so that the characters "12" are display on the field B1 of the operator window 23 with the correct orientation for the operator.

Figure 5:
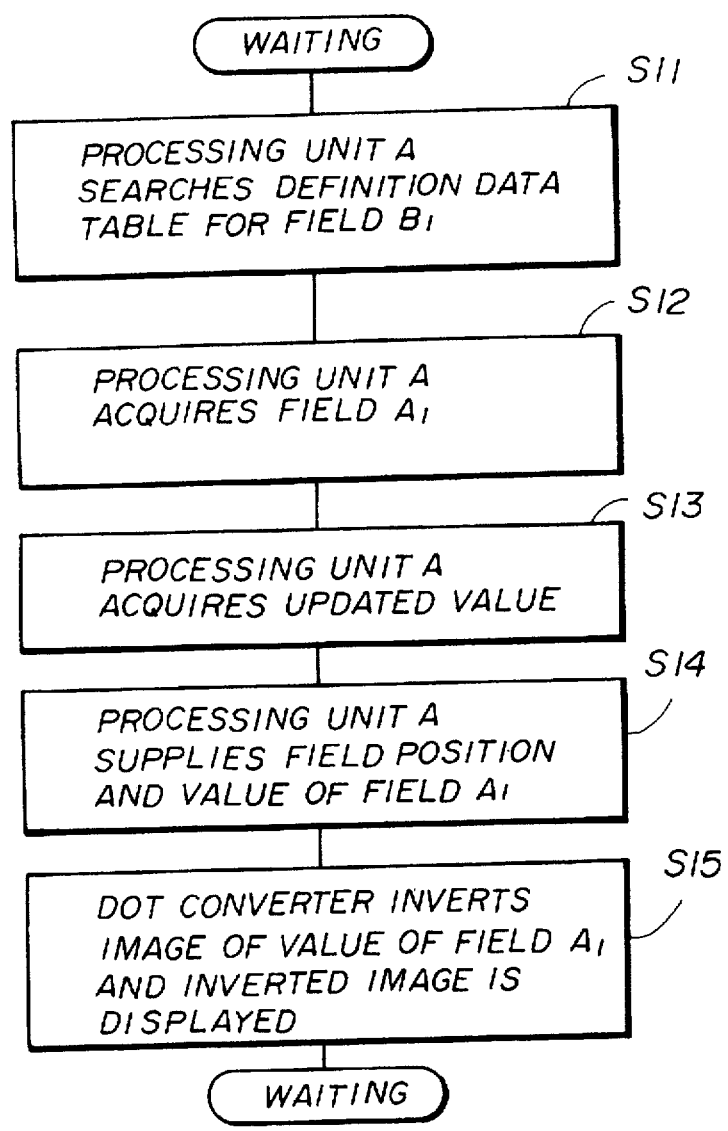
FIG. 5 is a flow chart illustrating a process executed in the display system.

When the first processing unit 21A receives the communication message from the second processing unit 21B, a process shown in FIG. 5 is performed.

Referring to FIG. 5, when the first processing unit 21A ("A") which is in the waiting state, receives from the second processing unit 21B the communication message indicating that the value of the field B1 has been changed, the first processing unit 21A searches the fields belonging to the operator window 23 in the definition data table 25 for the field B1, in step S11. The first processing unit 21A acquires a field A1 belonging to the customer window 22, which field A1 corresponds to the field B1 of the operator window 23 in the definition data table 25, in step S12. The first processing unit 21A acquires then the updated value "12" of the field B1 corresponding to the field A1, in step S13. The field A1 and codes representing the updated value are supplied from the second processing unit 21A to the dot converter 24, in step S14. The dot converter 24 converts the codes into image dot data representing an inverted image of the characters "12" identified by the code, and supplies the image dot data and the information indicating the field A1 to the display panel, in step S15. As a result, the characters "12", which are inverted, are displayed in the field A1 of the customer window 22. That is, the characters "12" are displayed on the customer window 23 with the correct orientation for the customer. After this, the first processing unit 21A goes in the waiting state.

Figure 6:
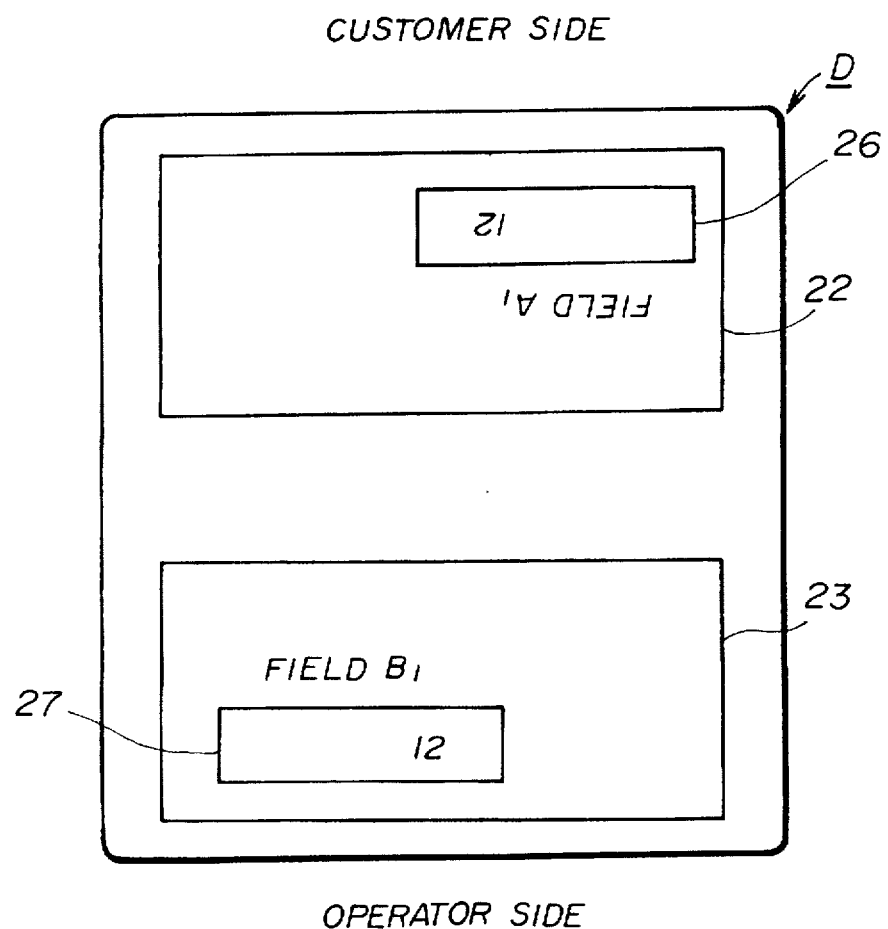
FIG. 6 is a diagram illustrating an example of a display panel provided in the display system.

The display panel is formed as shown in FIG. 6. In the display panel D, the characters "12", drawn by the light-pen in the field B1 in the input unit 27 placed in the operator window 23, are displayed in the field B1 of the operator window 23 and the characters "12", which are inverted, are displayed on the field A1 of the customer window 22. When the characters "12" are drawn in the field A1 in the input unit 26, placed in the customer window 22, the characters "12" are displayed in both the fields A1 and B1 of the windows 22 and 23 in the same manner as the above case. FIG. 6 indicates only the fields A1 and B1 formed on the windows 22 and 23. However, other fields are also formed on the windows 22 and 23, in which fields the customer's name, the address, the phone-numbers and the like can be displayed.

According to the first embodiment described above, the characters input to the one of the input units 26 and 27 are displayed in both the customer window 22 and the operator window 23 with the correct orientations for the customer and the operator facing each other. Thus, the customer and the operator can easily view the characters displayed in the customer window 22 and the operator window 23 in the display panel D.

A description will now be given of a second embodiment of the present invention.

Figure 7:
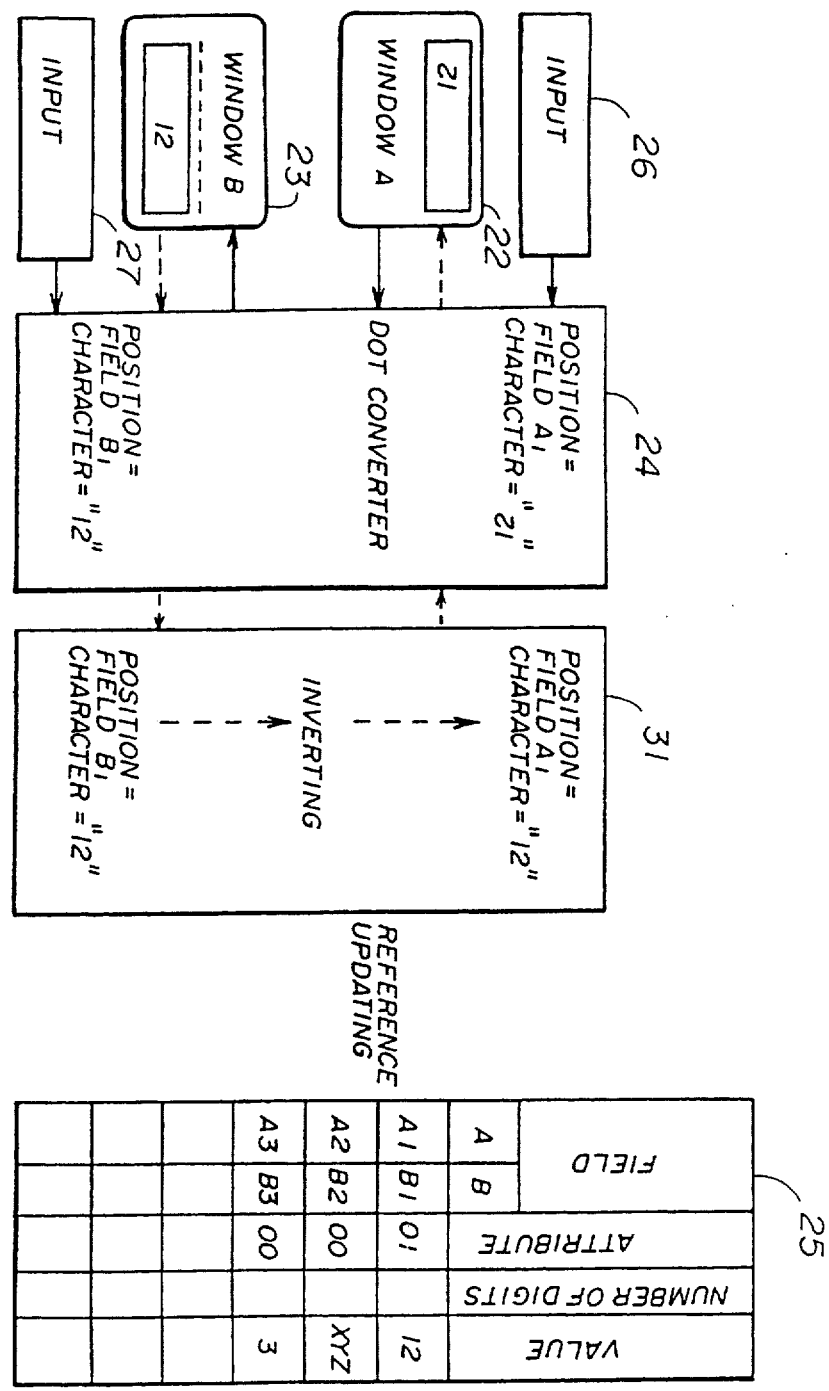
FIG. 7 is a block diagram illustrating a display system according to a second embodiment.

In the second embodiment, the first processing unit 21A and the second processing unit 21B shown in FIG. 3 are integrated into a single processing unit 31 as shown in FIG. 7. Referring to FIG. 7, the display system has the customer window 22, the operator window 23, the dot converter 24, the input units 26 and 27 and the definition data table 25 in the same manner as that shown in FIG. 3. The display system is provided with a single processing unit 31 for controlling both the customer window 22 and the operator window 23. Since both the windows 22 and 23 are controlled by the single processing unit 31, the definition data table 25 includes "attribute" to which attribute data of each of fields belongs. The attribute data represents whether or not information should be displayed in a corresponding field. For example, attribute data "00" represents that information should be displayed in a field A in the customer window 22 (a field in the customer window 22 is referred to as a field A), and attribute data "01" represent that information should not be displayed in the field A. In addition, for example, attribute data "02" represents that information should be displayed in a field B in the operator window 23 (a field in the operator window 23 is referred to as a field B), and attribute data "03" represents that information should not be displayed in the field B. The processing unit 31 determines, based on the attribute data in the definition data table 25, whether or not information is to be displayed in each of the fields in the windows 22 and 23.

Figure 8:
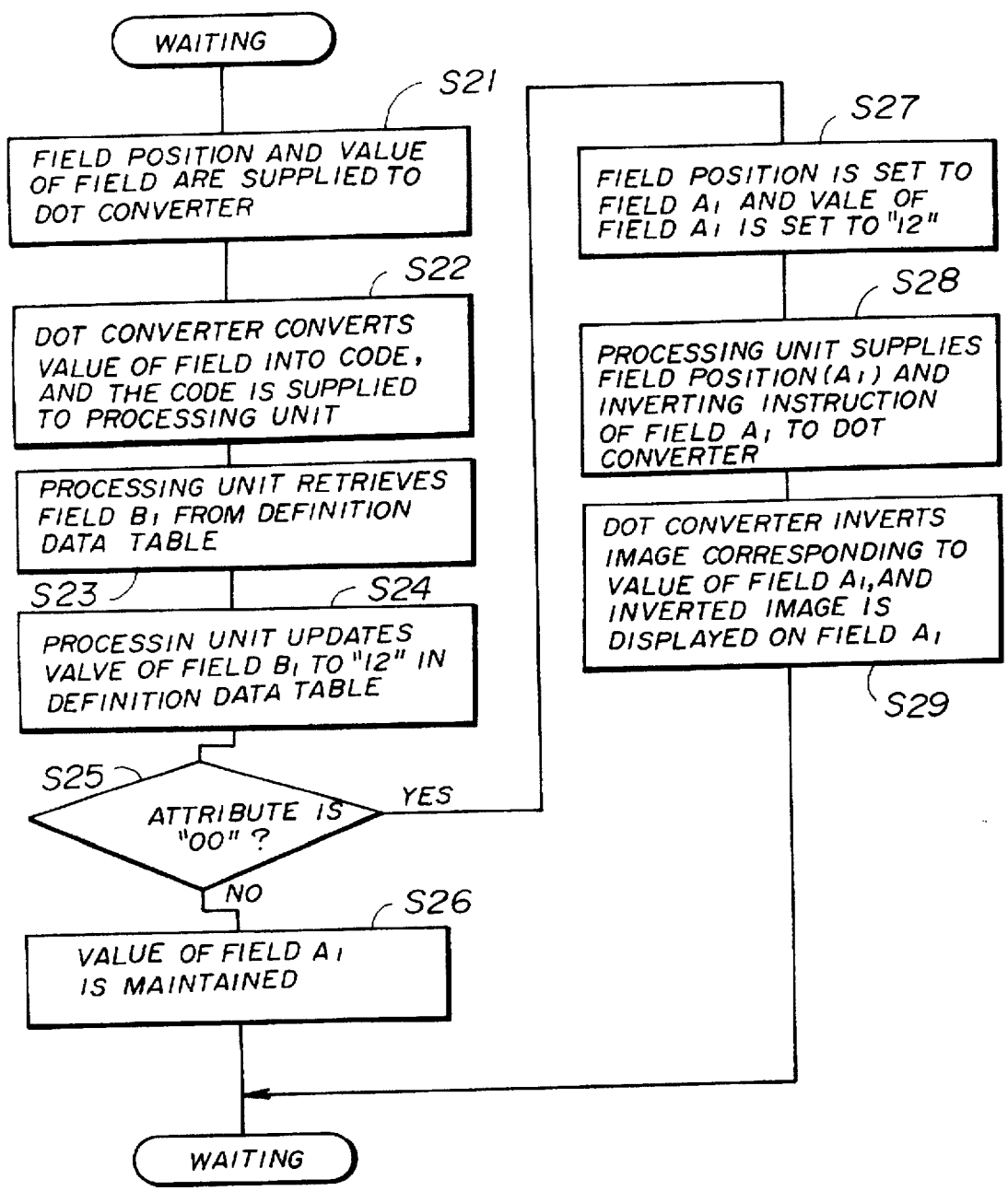
FIG. 8 is a flow chart illustrating a process executed in the display system shown in FIG. 7.

FIG. 8 shows an essential process executed by the display system shown in FIG. 7. Referring to FIG. 8, the processing unit 31 is first in the waiting state. When characters "12" are input to the operator window 23 by the light-pen of the input unit 27, the input unit 27 supplies to the dot converter 24 the position of the field in which the characters "12" are drawn and image data corresponding to the trace of the light-pen drawing the characters "12", in step S21. When the dot converter 24 receives the position of the field and the image data, the dot converter 24 retrieves the coordinates representing the position of the field from the definition data table and converts the image data corresponding to the characters "12" into codes in step S22. A field B1 identified by the position of the field and the codes are supplied from the dot converter 24 to the processing unit 31. The processing unit 31 searches the definition data table 25 for the field B1 in step S23. The processing unit 31 then updates the value of the field B1 to "12" as identified by the codes in step S24.

In the above process, when the dot converter 24 obtains the image data and the position identifying the field B1, the characters "12" corresponding to the image data are displayed in the field B1 of the operator window 22 with the correct orientation for the operator.

After step S24 is executed, the processing unit 31 determines, with reference to the definition data table 25, whether or not the attribute data for a field A1 in the customer window 22, which field A1 corresponds to the field B1, is "00", in step S25. The attribute data "00" represents that information is to be displayed in a field A in the customer window 22. Thus, if it is determined that the attribute data is "00", the value of the field A1 is updated to "12" in the same manner as that of the field B1 in step S27. The processing unit 31 supplies to the dot converter 24 a position identifying the field A1, codes corresponding to the value "12" of the field A1 and an instruction indicating that the characters corresponding to the codes are to be displayed in an inverted form, in step S28. When the dot converter 24 receives the above information, the dot converter 24 converts the codes into image data representing the characters "12" in the inverted form, so that the inverted character "12" are displayed on the field A1 of the customer window 23, in step 29. After this, the processing unit 31 goes into the waiting state.

On the other hand, if it is determined, in step S25, that the attribute data for the field A1 is "01", the value of the field A1 is maintained at the present value in the definition data table 25 in step S26. After this, the processing unit 31 goes into the waiting state. In this case, the characters "12" are not displayed in the field A1 of the customer window 22.

According to the second embodiment, in accordance with the attribute data for each field in the definition data table 25, it is decided whether or not the information is to be displayed in each field of the customer window 22 and the operator window 23. Characters are displayed in the customer window 22 and the operator window 23 respectively with the correct orientation for the customer and operator facing each other. In addition, if attribute data, representing that information is not to be displayed in a field on the customer window 22, is set in the data definition table, the information is automatically not shown in the field on the customer window 22 without the operator's determination.

A description will now be given of a third embodiment of the present invention. In the third embodiment, characters can be displayed on the display panel not only in an inverted form but also in a form rotated by any angle. In a case where a business talk between an operator and a plurality of customers is performed, it is desired that information be displayed on the display panel with the correct orientation for any customer. Thus, in the third embodiment, the information is displayed, for example, on the customer window 22 in a form rotated by any angle.

Figure 9:
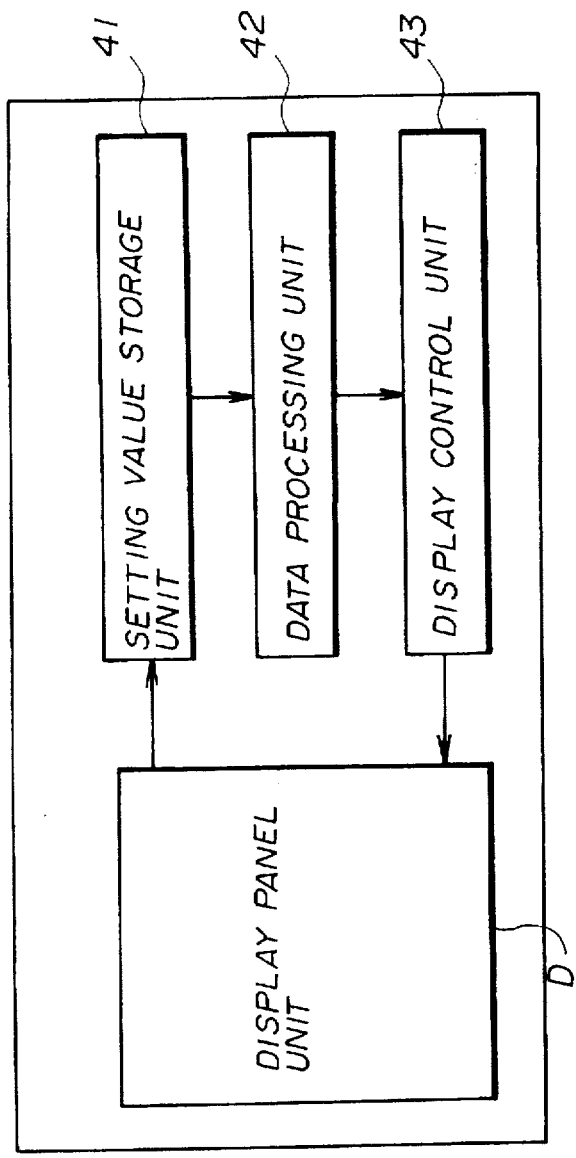
FIG. 9 is a block diagram illustrating a display system according to a third embodiment.

An essential part of the display system according to the third embodiment of the present invention is formed as shown in FIG. 9. Referring to FIG. 9, the display system has a display panel unit D, a setting value storage unit 41, a data processing unit 42 and a display control unit 43. The display system is also provided with an input unit (not shown in FIG. 9), such as a light-pen input unit or a keyboard. Information indicating whether or not characters displayed on the display panel D are rotated, a rotation angle, and other desired data items are input from the input unit.

Information corresponding to rotation angles in steps of 90° are set in the setting value storage unit 41. The information corresponding to the rotation angles may be set as second attributes in the definition data table 25 shown in FIGS. 3 and 7. It is preferable that the setting value storage unit 41 is separately provided in the display system. In this case, characters displayed on the display panel D in the form rotated by a rotation angle can be further rotated by another rotation angle set in the setting value storage unit 41.

Figure 10:
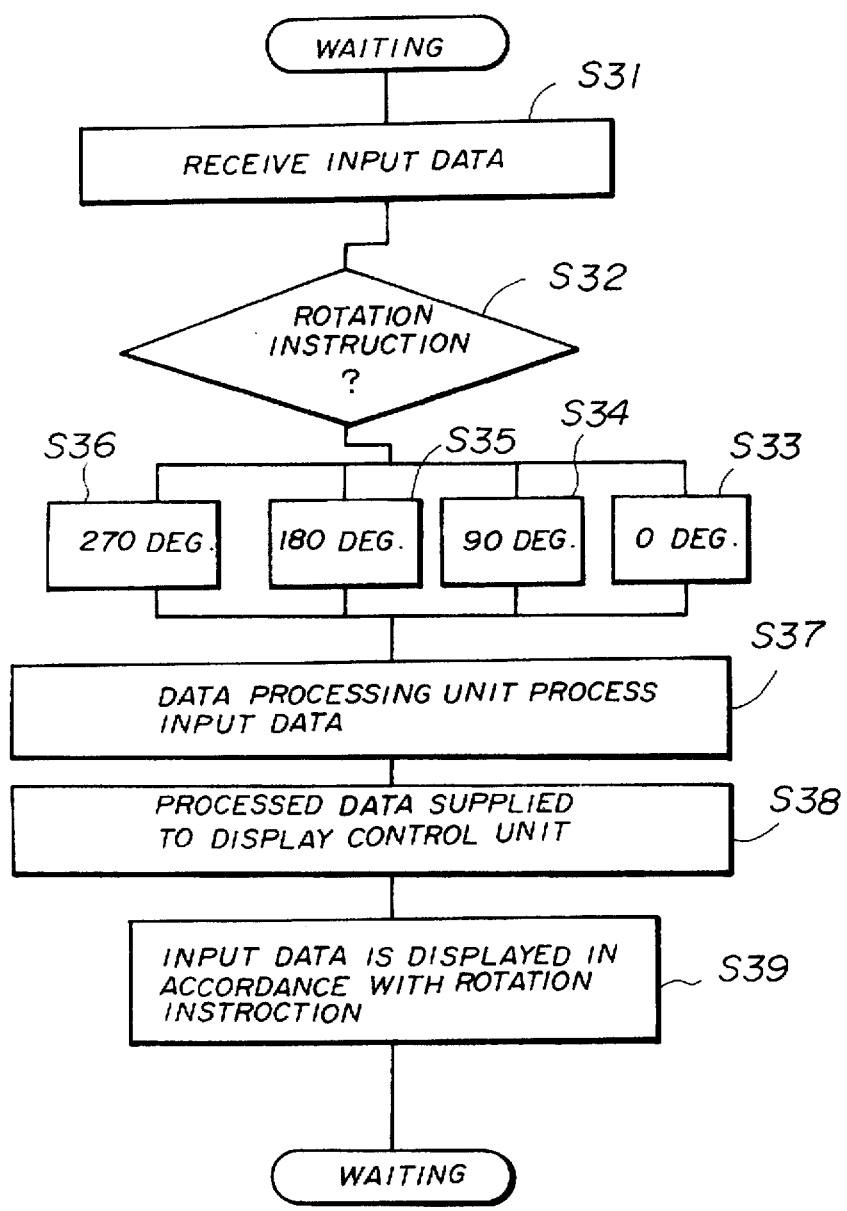
FIG. 10 is a flow chart illustrating a process executed in the display system shown in FIG. 9.

FIG. 10 shows a process for rotating characters displayed on the display panel unit D. Referring to FIG. 10, the system obtains input data from the input unit in step S31. It is determined, in step S32, whether or not the input data includes an instruction to rotate characters to be displayed on the display panel unit D. A rotation angle included in the instruction is selected from among rotation angles 0° (not rotated), 90°, 180° (inverted) and 270° and the information corresponding to the selected rotation angle is output from the setting value storage unit 41, in step S33, S34, S35 or S36. The input data, including image data representing a character or a code identifying a character, is processed by the data processing unit 42 using the information corresponding to the input rotation angle which information is supplied from the setting value storage unit 41, in step S37. As a result, image data representing the character rotated by the input rotation angle is obtained in the data processing unit 42. The image data obtained in the data processing unit 42 is supplied to the display control unit 43. The display control unit 43 controls the display panel unit D so that the character represented by the image data supplied from the data processing unit 42 is displayed, for example, in a field indicated by the light-pen in the customer window 22 formed on the display panel unit D, in step S39. That is, the character rotated by the input rotation angle is displayed in the field of the customer window 22.

Other rotation angles may be set in the setting value storage unit 41. The number of steps of rotation angles is not limited to the values described above.

According to the third embodiment, characters can be displayed in a field of one of the windows with the correct orientation for any person.

Figure 11:
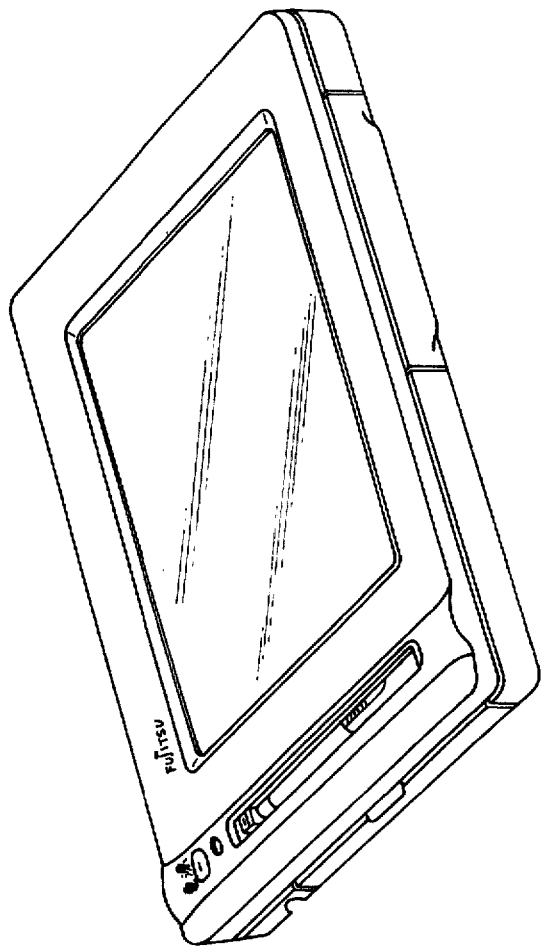
FIG. 11 is an exterior view of a pen-input type computer provided with a display system according to the present invention.

FIG. 11 shows an exterior view of a pen-input type computer in which the display system according to the present invention can be formed. The display system may have other form. The display panel is, for example, divided into two panels, one of them being used for an operator and another being used for a customer. The input unit may be formed so that a plurality of light-pens are used therein.

Figure 12:
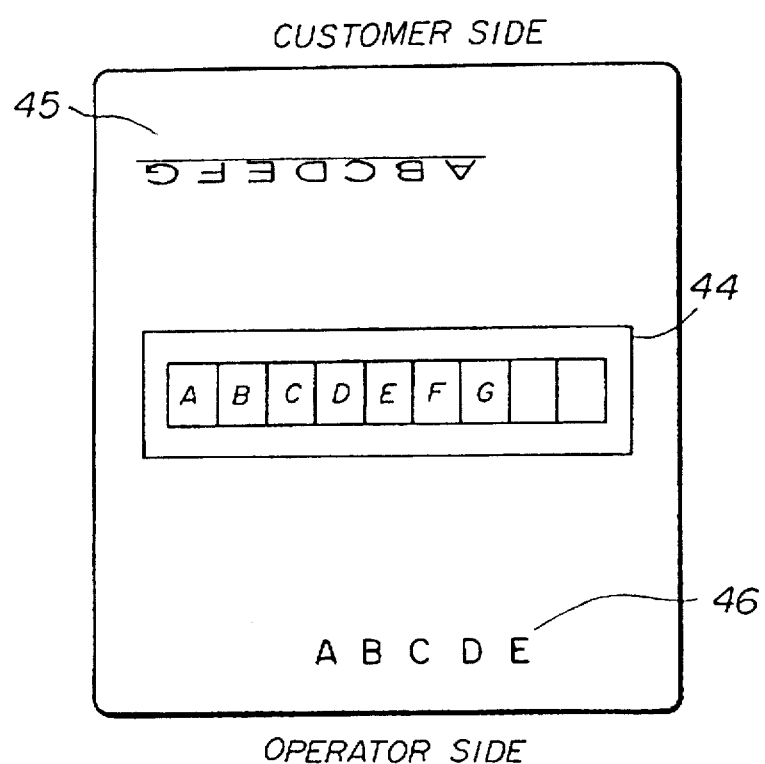
FIG. 12 is a diagram illustrating another example of a display panel provided in the display system.
Figure 2:
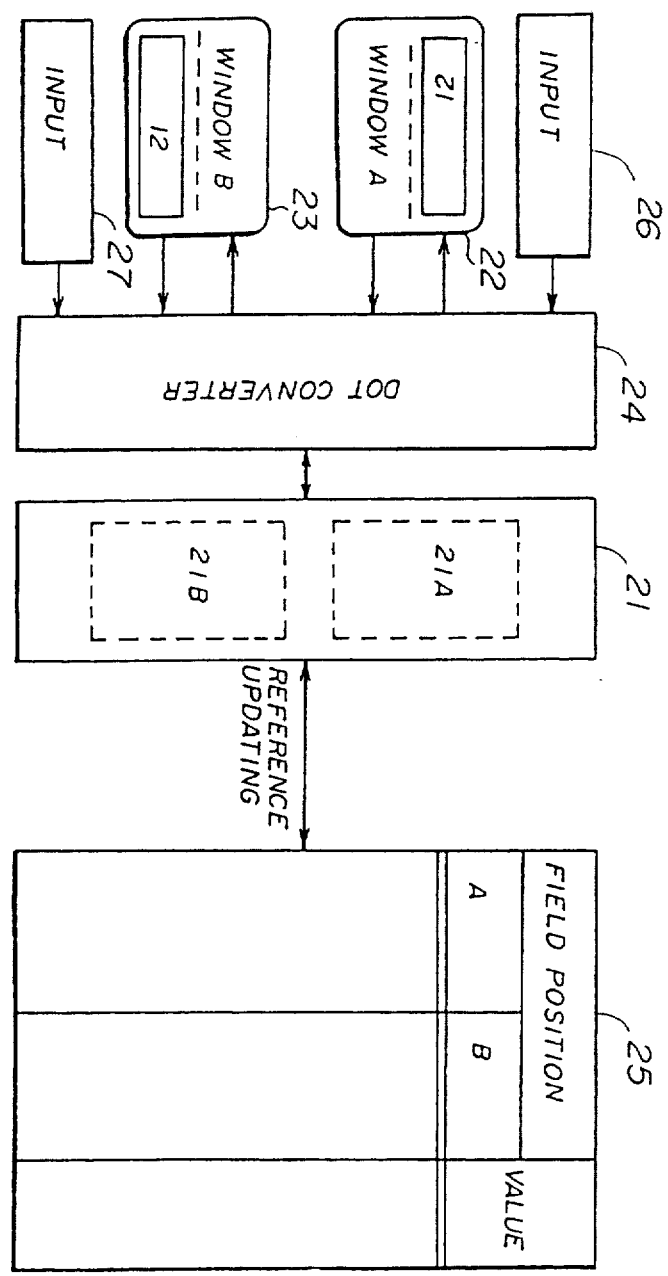
Figure 3:
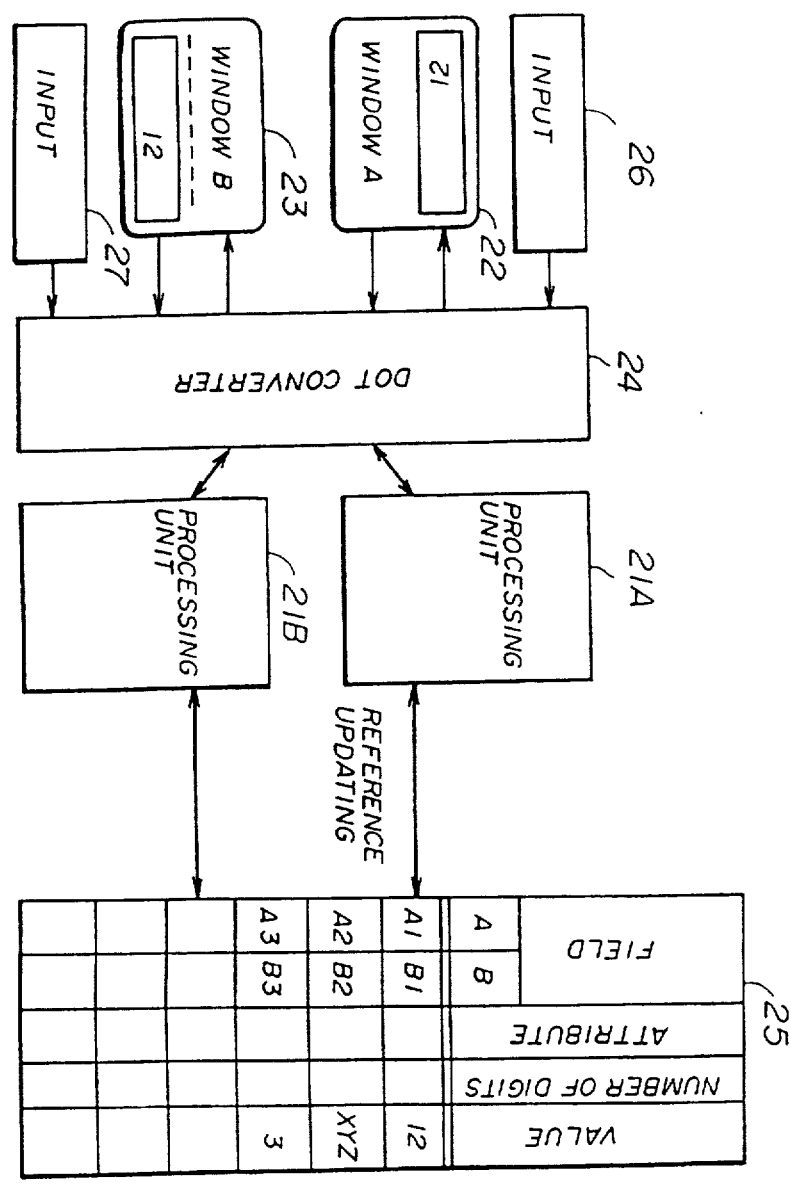

FIG. 12 shows a display panel of the pen-input type computer. Referring to FIG. 12, characters input to a character recognition pad 44 by an operator are displayed in a display area 45 with the correct orientation for a customer. The display panel has also another display area 46 for an operator. Characters displayed in the display areas 45 and 46 can be rotated by any rotation angle.

The present invention is not limited to the aforementioned embodiments, and variations and modifications may be made without departing from the scope of the claimed invention.

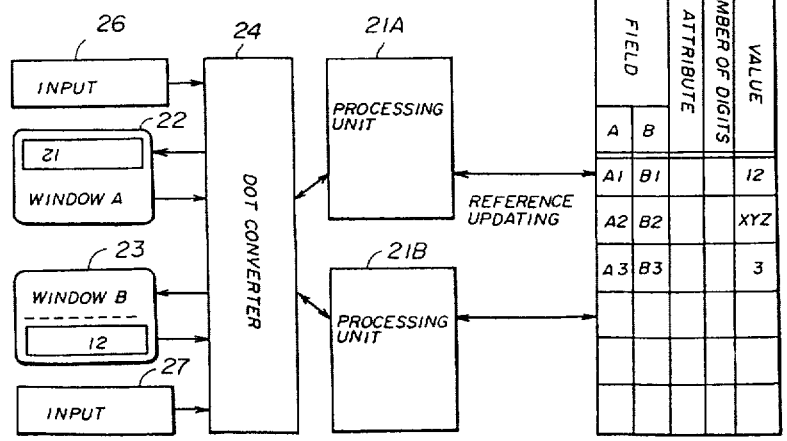

What is claimed is:

1. A display system comprising:
    a display unit having a plurality of display areas, respectively related to a plurality of different viewing positions, for selective display thereon of a plurality of corresponding images; and
    display control means for controlling the formation of said plurality of corresponding images for display on said plurality of display areas of said display unit so that the images are displayed in different orientations respectively related to said plural different viewing positions,
    wherein said display control means further comprises rotation means for controlling the display formation of an image in at least one of said plurality of display areas so that the image is rotated by a desired angle in a plane of the display area.

2. The display system as claimed in claim 1, further comprising means for setting a plurality of selectable, different angles of rotation by which an image may be rotated and means operable by an operator for selecting a desired angle of rotation from among the plurality of angles of rotation previously set in said display system.

3. The display system as claimed in claim 2, wherein the plurality of angles differ incrementally in steps of 90°.

4. The display system as claimed in claim 1, wherein said plurality of display areas comprise a plurality of different portions of a single display panel.

5. A display system comprising:
    a display unit having a plurality of display areas respectively related to a plurality of different viewing positions, each of said plurality of display areas being divided into a plurality of fields for selective display thereon of a plurality of corresponding images;
    a storage unit which stores a table of data indicating respective fields, of said plurality of display areas, which correspond to each other; and
    display control means for controlling formation of identical images for display in said plurality of corresponding fields of said plurality of display areas in the image orientations indicated by the table.

6. The display system as claimed in claim 5, wherein said plurality of display areas comprises first and second display areas having respective first and second, opposite orientations in which images are displayed thereon.

7. The display system as claimed in claim 5, wherein said table is provided with information corresponding to an image to be displayed identically in each of the plurality of corresponding fields of the respective plurality of display areas, said display control means being responsive to the information for displaying the image, corresponding to the information, identically in each of the plurality of corresponding fields of the respective plurality of display areas of said plurality of display areas.

8. The display system as claimed in claim 7, said control means further comprising input means for inputting image data corresponding to an image to be displayed identically in each of the respective plurality of corresponding fields of the plurality of display areas, and updating means for updating the information in said table with the image data input by said input means.

9. A display system comprising:
    a display unit having a plurality of display areas, respectively related to a plurality of different viewing positions, for selective display on a plurality of corresponding images;
    a storage unit which stores a table of data indicating whether or not an image is to be displayed in each display area of said plurality of display areas; and
    display control means, requiring the image to be displayed thereon, with the responsive to the data indicating the display areas designated to have an image display therein, for controlling the formation of corresponding images for display selectively in the designated display areas.

10. The display system as claimed in claim 9, wherein said plurality of display areas comprises first and second display areas having respective first and second, opposite orientations in which images are displayed thereon.

11. A display system comprising:
    a display unit having a plurality of display areas, respectively related to a plurality of different viewing positions, for selective display thereon of images; and
    display control means for controlling formation of an image for display on one of said plurality of display areas by rotating said image in the plane of said display area by selected angle, or angle of rotation, and for controlling formation of images for display on other display areas so that the images are displayed in different orientations respectively related to said plurality of different viewing positions.

12. The display system as claimed in claim 11, further comprising means for setting a plurality of selectable, different angles of rotation by which an image may be rotated and means operable by an operator for selecting a desired angle of rotation from among the plurality of angles of rotation previously set in said display system.

13. The display system as claimed in claim 12, wherein the plurality of angles differ incrementally in steps of 90°.

* * * * *

UNITED STATES PATENT AND TRADEMARK OFFICE
CERTIFICATE OF CORRECTION

PATENT NO. : 5,757,369
DATED : May 26, 1998
INVENTOR(S) : Kengo Ohsawa, et al

It is certified that error appears in the above-identified patent and that said Letters Patent is hereby corrected as shown below:

The title page, showing an illustrative figure, should be deleted and substitute therefor the attached title page.

Delete Drawing Sheets 2, 3, and 7, and substitute therefor the Drawing Sheets consisting of FIGS. 2, 3, and 7, as shown on the attached pages.

Title Page, Assignee, change "FUJITSI" to --FUJITSU--.

In Fig. 4A, change "DISPLAL" to --DISPLAY-- and change "PROCESING" to --PROCESSING--.

In Fig. 8, change "PROCESSIN" to --PROCESSING-- and change "VALE" to --VALVE--.

In Fig. 10, change "INSTROCTION" to --INSTRUCTION--.

Col. 3, line 41, change "O.O." to --D.D.--.

Col. 4, line 44, change "uses" to --used--.

Signed and Sealed this

Seventeenth Day of November, 1998

*Attest:*

BRUCE LEHMAN

*Attesting Officer*      *Commissioner of Patents and Trademarks*

United States Patent
Ohsawa et al.

Patent Number: 5,757,369
Date of Patent: May 26, 1998

[54] DISPLAY SYSTEM HAVING PLURALITY OF DISPLAY AREAS

[75] Inventors: Kengo Ohsawa; Yoshiharu Morohashi; Satomi Sakai, all of Kawasaki, Japan

[73] Assignee: Fujitsi Limited, Kawasaki, Japan

[21] Appl. No.: 748,720

[22] Filed: Nov. 14, 1996

Related U.S. Application Data

[63] Continuation of Ser. No. 214,279, Mar. 17, 1994, abandoned.

[30] Foreign Application Priority Data

Mar. 31, 1993 [JP] Japan ................... 5-073877

[51] Int. Cl.$^6$ ................................................. G06F 3/14
[52] U.S. Cl. ................................................. 345/340; 345/346
[58] Field of Search ................................ 395/340, 341, 395/342, 343, 344, 345, 346, 347

[56] References Cited

U.S. PATENT DOCUMENTS

| | | | |
|---|---|---|---|
| 4,245,321 | 1/1981 | Gennetten | 395/137 |
| 4,467,448 | 8/1984 | Regehr et al. | 395/115 |
| 4,973,951 | 11/1990 | Shigeta et al. | 345/1 |
| 4,988,995 | 1/1991 | Buisson et al. | 340/971 |
| 5,113,251 | 5/1992 | Ichiyandai et al. | 358/500 |
| 5,121,195 | 6/1992 | Seki et al. | 358/515 |
| 5,121,478 | 6/1992 | Rao | 395/346 |
| 5,198,909 | 3/1993 | Ogiwara et a. | 358/412 |
| 5,264,948 | 11/1993 | Imoto | 358/474 |
| 5,302,970 | 4/1994 | Lakso et al. | 345/168 |

FOREIGN PATENT DOCUMENTS 58-2881  1/1983  Japan.

*Primary Examiner*—Thomas G. Black
*Assistant Examiner*—Ruay Lian Ho
*Attorney, Agent, or Firm*—Staas & Halsey

[57] ABSTRACT

A display system includes a plurality of display areas on which images are displayed, and a processing unit for controlling display formation of images on the plurality of display areas so that the images are displayed with predetermined orientations different from each other. Another type of display system includes a display panel on which an image is displayed, and a processing unit for controlling display formation of an image on the display panel so that the image is displayed rotated by an angle.

13 Claims, 12 Drawing Sheets